United States Patent Office 3,846,106
Patented Nov. 5, 1974

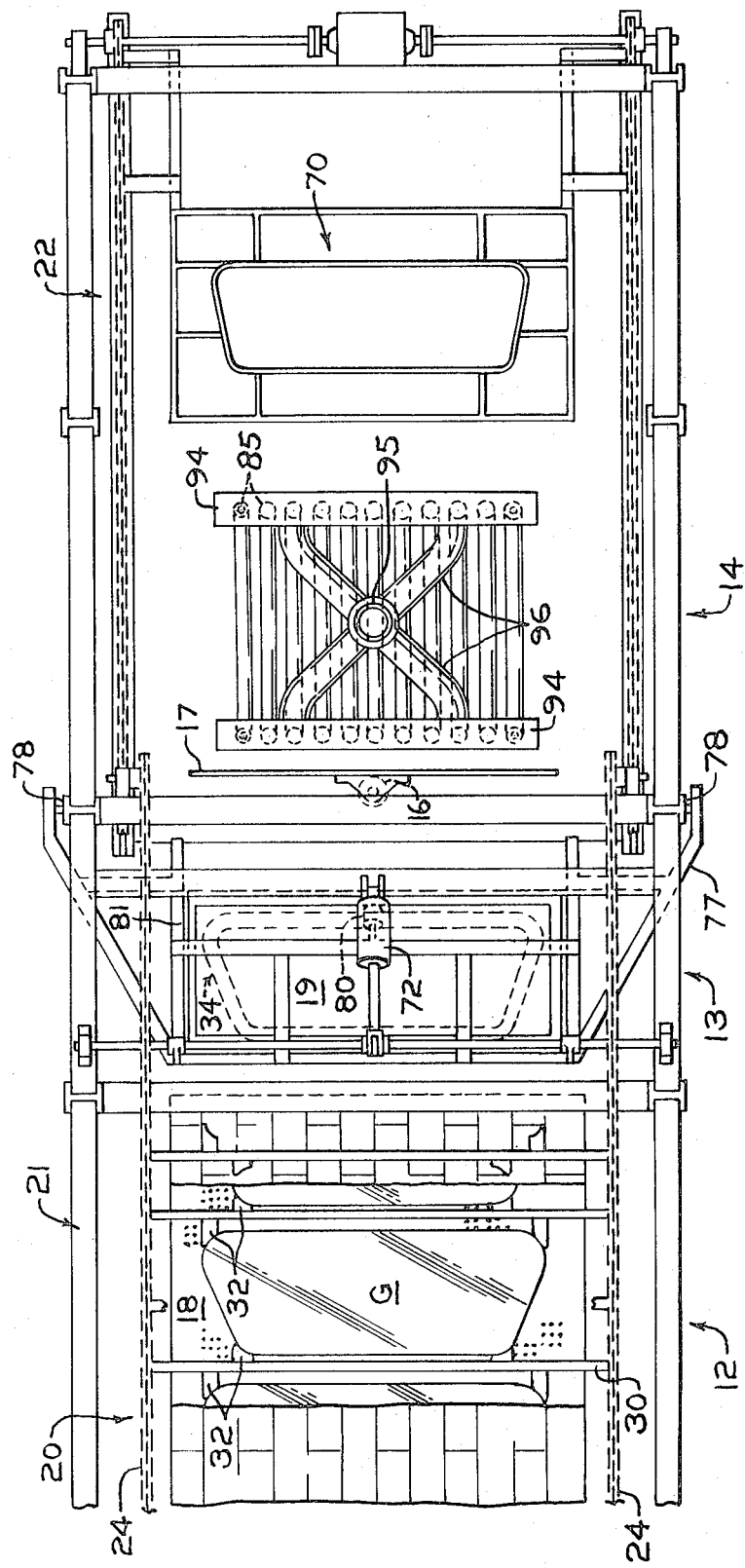

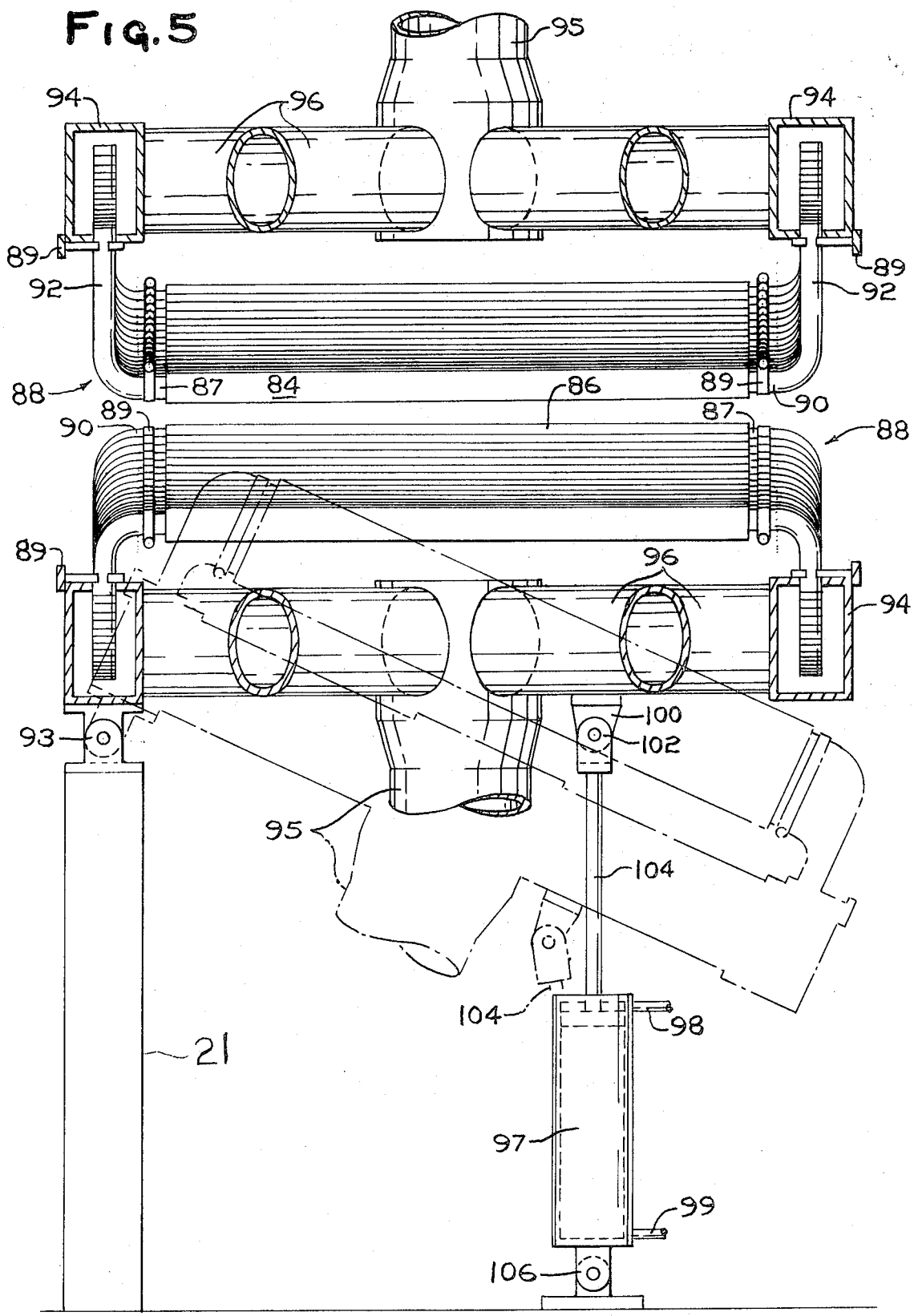

3,846,106
TEMPERING GLASS SHEETS
Samuel L. Seymour, Oakmont, Pa., assignor to PPG Industries, Inc., Pittsburgh, Pa.
Continuation-in-part of application Ser. No. 322,580, Jan. 10, 1973. This application Mar. 8, 1974, Ser. No. 449,298
Int. Cl. C03b 27/00
U.S. Cl. 65—114
7 Claims

ABSTRACT OF THE DISCLOSURE

In thermally tempering glass where glass sheets are first heated in a furnace and then cooled rapidly, sometimes a sheet breaks into a multitude of small fragments at the cooling station. It is difficult to remove the fragments before the next sheet reaches the cooling station in a mass production tempering operation, especially in a horizontal tempering process where glass sheets are oriented horizontally between an upper plenum and a lower plenum. The present invention provides means to facilitate the removal of fragments of fractured glass at a cooling station, particularly means to provide sliding removal of glass fragments, preferably in a direction away from the furnace so as to facilitate removal of the glass fragments as far way from the furnace as possible.

CROSS-REFERENCE TO RELATED APPLICATIONS

This application is a continuation-in-part of U.S. application Ser. No. 322,580 of Samuel L. Seymour, filed Jan. 10, 1973 for handling glass sheets for shaping and cooling.

BACKGROUND OF THE INVENTION (1) Field of the invention

The invention relates to the tempering of glass sheets and is particularly suitable in the fabrication of shaped, tempered glass sheets. While the invention will be described in a field where the glass is shaped by a so-called vacuum forming process by which glass sheets in succession are initially heated to a deformation temperature, then brought into pressurized engagement against an upper mold having a vacuum chamber while heat-softened to shape each sheet and then cooled sufficiently rapidly to temper or toughen or heat-strengthen the glass sheets, it will be understood that the present invention may be employed in any environment in which glass sheets are heated to a temperature above the strain point and approaching the softening point and then suddenly chilled in order to toughen or to impart at least a partial thermal temper to the glass.

The process of tempering glass sheets results in imparting to the glass a surface compression stress that completely encloses an interior zone stressed in tension. Since glass is notoriously weak in tension and strong in compression, tempered glass is stronger than untempered glass by virtue of the skin of surface compression stress that surounds the interior of tension stress. However, in case the glass sheet being treated has flaws, the flawed glass may develop a tension stress in the surface so that during fabrication, and particularly, during the rapid cooling or quenching that follows the heating step, the glass is likely to break into extremely tiny fragments.

In the past, with glass sheets supported in a horizontal plane at the cooling station, it has been very difficult to remove these fragments from the cooling station. It has been necessary for operators to insert implements, such as wooden sticks, between upper and lower nozzles to force the fragments out of the space between the upper and lower nozzles. Manual manipulation of such implements to remove glass fragments is both expensive and time consuming, even when fragments of flat glass are to be removed. Furthermore the inability of implements to remove all of the fragments from the cooling station before the next sheet arrived has caused one or more successive sheets after the fractured sheet to be rejected because the remaining fragments either caused successive glass sheet to fracture or to become scratched so that they did not have the optical properties necessary for customer needs. In addition, when glass sheets are shaped prior to their being tempered they are usually transported in a direction parallel to the axis of bending so that it becomes extremely difficult for operators with access to the space between upper and lower nozzles only from the sides of the cooling station to insert a tool or implement to remove the glass fragments unless the glass is shaped to a very shallow curvature of substantially uniform radius of curvature and the implements used to remove the glass fragments shaped accordingly. Such problems of glass fragment removal does not exist when glass sheets are disposed in a vertical plane between opposed sets of nozzles also disposed vertically.

(2) Description of the prior art

U.S. Pat. No. 3,223,252 to Mikus supports and engages the lower end edges of a series of glass sheets supported on an oblique plane of support by a gas bed by rotatable driving discs that propel the sheets forward along the gas bed. Whenever a glass sheet breaks into fragments, a series of discs is removed from glass supporting position to allow the fragments to float downward unimpeded by the driving discs to one side of the bed. The series of discs is returned to the driving position in time to engage a succeeding sheet being treated. To the best of my knowledge, no apparatus existed prior to my invention that avoided the use of hand tools to remove glass fragments in case glass sheets were treated in a horizontal orientation at the cooling station of glass tempering apparatus.

SUMMARY OF THE INVENTION

The present invention makes it possible to remove fragmeits of glass in a cooling station of a horizontal glass sheet tempering apparatus much more efficiently than the prior art. The present invention is especially adapted for use in a cooling station of so-called horizontal tempering apparatus where glass sheets are supported in a substantially horizontal disposition. Such a cooling station is provided with first or upper means for delivering tempering medium in a downward direction under pressure toward the upper surface of a heated glass sheet, second or lower means for delivering tempering medium under pressure in an upward direction toward the lower surface of the glass sheet and means for supporting a heated glass sheet in a substantially horizontal disposition intermediate the first and second tempering medium delivering means. According to the present invention the second tempering medium delivering means is supported in pivotable relation to a support means, and means operatively connecting the second tempering medium delivering means to said support means is provided to pivot the second tempering medium delivering means between a substantially horizontal disposition that it normally occupies during a glass tempering operation and an oblique orientation that it occupies temporarily when fragments requiring rapid removal are present. Preferably, the oblique orientation is downward in a direction away from the furnace which is used to heat a succession of glass sheets which are rapidly cooled at the cooling station. Thus, an operator can remove the fragments from the floor below the cooling station after the second tempering medium delivering means resumes its operative position in a substantially horizontal plane with minimum annoyance from the heat of the furnace.

The second means for delivering tempering medium under pressure in an upward direction toward the lower surface of the glass sheet comprises a series of parallel pipes of rectangular cross section which normally extend substantially horizontally in the direction of glass movement. Each end has an adapter attached to one of a pair of longitudinally aligned elbows. Each elbow has a horizontal portion attached to the adapter at one end of each pipe and a vertical portion axially adjustable to interfit within a receiving aperture of a plenum.

The upper wall of each of the pipes of the second means for delivering tempering medium is apertured for delivery of tempering medium therethrough and has a smooth upwardly facing surface substantially free of protuberances such as provided by nozzles. The smooth surface provides minimum frictional resistance to the slidable movement of fragments when the pipes are rotated into an oblique orientation.

Each of the parallel pipes is individually adjustable in a vertical position by axial adjustment of the vertical portions of the elbows attached to its opposite ends so that they are adjustable into a side by side relationship forming a configuration substantially to the shape of a glass sheet that is to be cooled. This configuration may be flat or curved. The upper surface of the pipes is essentially smooth and flat so that when the second tempering medium delivery means is pivoted obliquely downward away from the furnace, the glass fragments slide readily to the floor of the cooling station in a position beyond the cooling station where the fragments can be readily removed.

Adjacent pipes are spaced from one another to provide a series of elongated passageways for the escape of blasts of tempering medium after they have impinged against the exposed surface of a glass sheet undergoing cooling. The walls of the pipes are relatively thin compared to the length and width of the apertures so as to enable the blasts of tempering medium delivered through the apertures to spread out enroute to the glass surface so that each blast impinges on an area of the glass surface that is considerably larger than the area of the apertures. Means is provided to provide relative reciprocation between the glass sheet and the pipes along an axis parallel to the width of the apertures to enable the widened blasts of tempering medium to cover the entire glass sheet substantially uniformly so as to cool the glass substantially uniformly throughout its entire extent.

These and other elements of the present invention will be understood more clearly in the light of a description of an illustrative embodiment which follows.

BRIEF DESCRIPTION OF THE DRAWINGS

In the drawings where like reference numbers are applied to like structural elements.

FIG. 2 is a fragmentary, plan view of the embodiment of FIG. 1, with certain parts omitted to show other parts more clearly;

FIG. 5 is an enlarged side view of cooling pipes in solid lines showing the lower or second tempering medium delivering means in a horizontal position occupied when a glass sheet is being cooled for tempering and in phantom lines in an oblique position wherein fragments may be readily removed in a direction away from the furnace.

DESCRIPTION OF THE ILLUSTRATIVE EMBODIMENT

Figure 1:
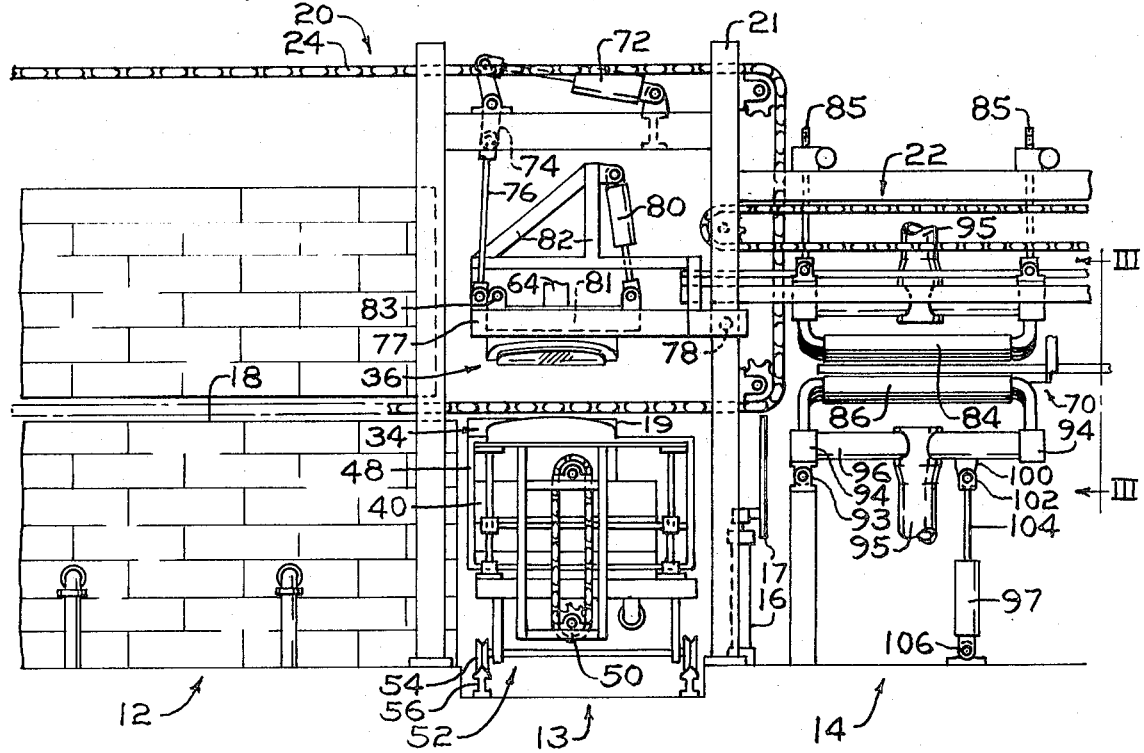
FIG. 1 is a fragmentary, longitudinal view of an illustrative embodiment of the present invention, with parts omitted for the sake of clarity.

Referring n owto the drawings, an apparatus for shaping and tempering sheets of material, such as glass, includes a heating means or furnace 12 through which glass sheets are conveyed from a loading station (not shown) while being heated to the glass deformation temperature. A shaping station 13 is disposed immediately beyond the furnace exit. A cooling station generally indicated at 14 is located beyond the shaping station 13, and an unloading station (not shown) is disposed beyond the cooling station. Heat may be supplied by hot gases from gas burners or by electrical radiant heaters or by a combination of both in the furnace and at the shaping station 13, as is well known in the art.

A piston 16 is operatively connected to a vertically movable shield 17 located between the shaping station 13 and the cooling station 14. When the shield 17 is raised, it protects the shaping station 13 and the furnace 12 from cool blasts of tempering medium imparted at the cooling station 14. When shield 17 is lowered, it allows a tempering ring 70 to transport a glass sheet from the shaping station 13 to the cooling station 14.

The heating means includes a gas support bed 18 which extends only through the furnace 12 and a support bed extension 19 located at the shaping station 13. Both the support bed 18 and the extension 19 have vertical apertures through which hot gases are dispensed against the lower surface of the glass sheet to serve two purposes, to heat and support glass sheets as the latter are conveyed through the furnace 12 and brought to the shaping station 13.

The illustrative embodiment includes a conveying means which comprises a first conveyor 20 of the double chain type for conveying glass sheets through the furnace 12 and into shaping station 13, and a second conveyor 22, also of the double chain type, which conveys a tempering ring 70 for moving one sheet at a time between the shaping station 13 through the cooling station 14 to the unloading station. A skeleton support structure 21 is provided to support the conveyors 20 and 22 as well as the various stations incorporated in the tempering apparatus.

The support bed 18 is of the type having a plurality of inlets and exhausts communicating with the upper surface thereof so that gases may be supplied over the surface of the bed to float glass sheets in closely spaced relation thereto. This type of support bed is described in U.S. Pats. Nos. 3,223,500 to George W. Misson and 3,223,504 to Clair W. Fredley and George E. Sleighter. Further details of this support bed may be obtained from these patents.

Hot gas is supplied to the upper surface of the support bed 18 by a series of gas burners and variable speed fans that control the pressure of the hot gas supplied to the upper surface of the support bed. Means is provided for the escape of hot gas throughout the bed 18 and the extension 19. The hot gas inlet means for feeding hot gas to the upper surface of the support bed 18 and the exhaust passages for permitting the gas to leave intermediate the inlet passages are arranged preferably as described in U.S. Pat. No. 3,332,759 to McMaster et al. Controlling the ratio of total area of the inlet means to the total area of the exhaust passages in the regions facing the moving glass sheets maintains the gas bed and prevents the glass from coming into contact with the upper surface of the support bed 18 or the extension 19.

The first conveyor 20 includes a pair of longitudinally extending parallel chains 24 interconnected by pusher bars 30. The latter extend across the furnace 12 through longitudinal slot openings in the opposite walls of the furnace.

The pusher bars 30 are spaced apart a distance sufficient to provide clearance for the widest glass sheets to be processed. A set of glass engaging elements 32 of size and configuration needed to bridge the gap between a portion of the glass sheet edge and the adjacent pusher bar 30 is attached to each pusher bar 30. The glass engaging end of each element 32 is shaped to conform to the portion of the edge of the glass sheet it engages to insure that glass sheets of irregular outline remain in proper alignment along the length and width of the conveyor 20 as the glass sheets are conveyed through the furnace 12 and into the shaping station 13 while floated above the bed 18 and the bed extension 19 by the pressure of the gas bed.

The glass shaping station 16 comprises a lower mold 34 in the form of an outline shaping mold having an upward facing surface conforming to the shape desired for the outline portion of the glass sheet after shaping and an upper mold 36 in the form of a vacuum chamber having an apertured bottom wall whose surface conforms in shape to the shape along the upper edge of the lower outline shaping mold 34. The gas support bed extension 19 is disposed at the shaping station 16 above a hot gas supply chamber 40. The latter receives hot gas under pressure from a gas burner and discharges upward directed gaseous blasts through communicating passages (not shown) and through apertures in the gas support bed extension 19 to provide an extension of the support bed provided throughout the length of the furnace. The hot gases heat a glass sheet that arrives at the shaping station 13 and prevents the glass from cooling prematurely so that the glass sheet is maintained at a sufficiently high temperature to develop an appropriate temper when cooled rapidly at the cooling station 14.

The lower outline shaping mold 34 comprises a metal ring that may be either a continuous ring or may comprise articulated sections. The ring is movable between an upper position to provide pressurized engagement against the lower surface of a glass sheet whose upper surface is forced against the downward facing wall of the upper mold 36 and a lower position wherein outline mold 34 is received within a continuous groove in the gas bed having a shape that conforms with the outline of the lower outline shaping mold 34.

The outline shaping mold is attached to a unitary frame means 48 and is vertically adjustable with said frame means by an elevator means 50 such as a chain drive means shown in FIG. 1 or any other means capable of imparting vertical motion. The outline shaping mold 34, the unitary frame means 48 and its elevator means 50 are all mounted on a support carriage 52. The latter has wheels 54 mounted on tracks 56 to facilitate removal and replacement of the outline shaping mold 34 and its supporting means whenever quick access is needed for maintenance or repair or replacement.

Thr upper shaping mold 36 is a conventional vacuum mold with an apertured refractory lower wall shaped to conform to the shape desired for the upper surface of the glass sheet and which wall forms the bottom of the vacuum chamber secured to a support. The chamber is connected to a source of vacuum (not shown) through a flexible conduit 64.

The upper mold 36 is capable of being lifted and/or pivoted when desired to provide clearance for the introduction or removal of a tempering ring 70 beneath the upper vacuum shaping mold 36. A first piston 72 having one end pivotally supported on an upper cross-beam of frame support structure 21 has a free end of its piston rod pivotally attached to a crooked lever arm 74. The latter in turn is pivotally supported on the frame support structure 21. The crooked lever arm 74 is connected to a connecting rod 76 of adjustable length. The latter rod, in turn, is pivotally connected at its lower end to an outer frame 77. The latter frame is pivotally connected at its forward end to frame support structure 21 by a pivot means 78. The outer frame 77 also includes a superstructure 82.

A second piston 80 has the lower end of its piston rod pivotally secured to an inner frame 81 next to the upper mold 36. The upper end of the second piston 80 is pivotally attached to the superstructure 82. The inner frame 81 is pivotally mounted on outer frame 77 through pivot means 83 at its rear end. Piston 80 thus actuates upper pivoting of the front end of vacuum mold 36 within a frame 81 about pivot means 83, while piston 72 actuates upper pivoting of the rear end of the upper vacuum mold 36 together with both inner frame 81 and outer frame 77 about pivot means 78. When pistons 72 and 80 are both actuated for upward rotation they can lift the upper mold 36 entirely from a lower position it occupies when receiving a glass sheet G lifted by the outline shaping mold 34 and an upper retracted position to provide clearance for the tempering ring 70 to move into and out of the shaping station 13.

Figure 4:
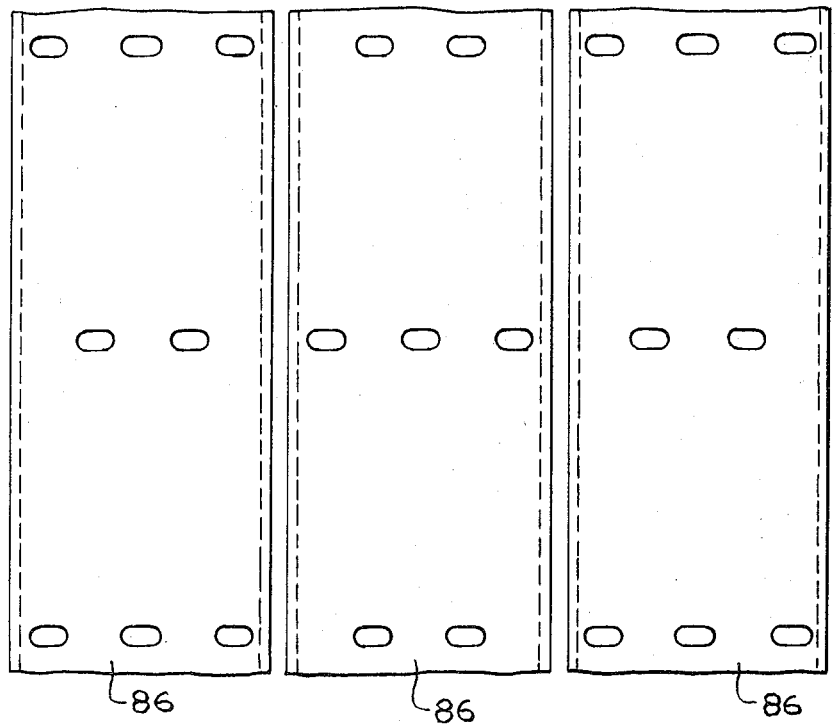
FIG. 4 is an enlarged fragmentary end view taken along the lines IV—IV of FIG. 3.
Figure 3:
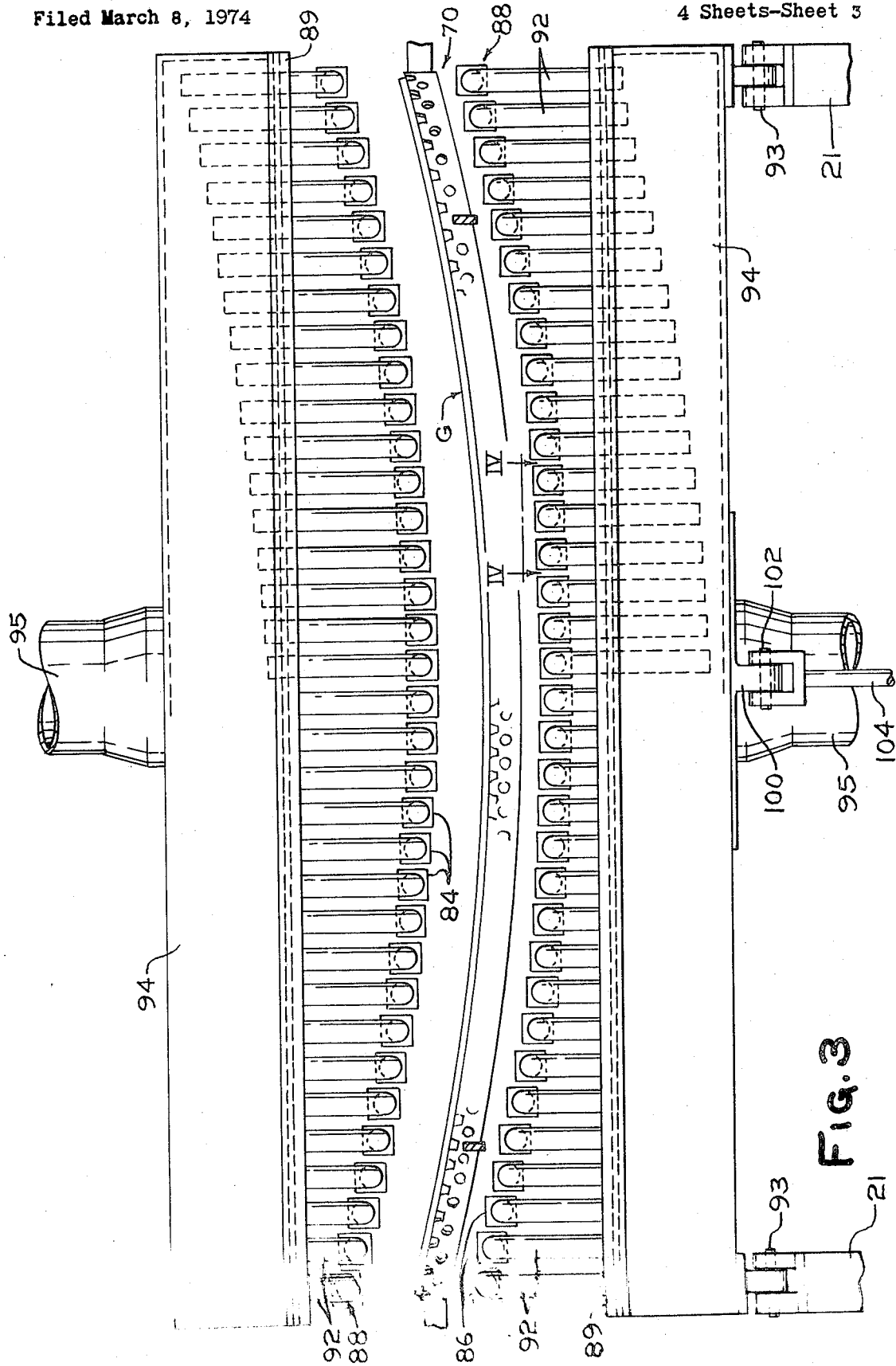
FIG. 3 is an enlarged end elevation of a cooling station showing how individual pipes of rectangular cross-section are disposed relative to one another and is taken along the line III—III of FIG. 1.

The cooling station 14 is shown in detail in FIGS. 3 to 5, and comprises a first or upper tempering medium delivery means comprising an upper set of parallel, elongated, rectangular pipes 84, each having longitudinally spaced rows of elongated apertures offset laterally of the pipe length from row to row disposed along its wall facing downward and a second or lower tempering medium delivery means comprising a lower set of parallel, elongated, rectangular pipes 86 each having longitudinally spaced rows of elongated apertures disposed along its wall facing upward and having its apertures aligned with the apertures of the upper set of pipes. The pipes are of rectangular cross-section and have smooth surfaces in the apertured walls facing the opposite sides of glass sheets at the cooling station 14, particularly the upward facing walls of the lower pipes. Each pipe extends parallel to the path of the conveyors 20 and 22 and has an adaptor 87 at each end attached to one or the other of a pair of longitudinally aligned elbows 88 through clamps 89 (FIG. 5).

Each elbow 88 has a horizontal portion 90 attached by a clamp 89 to an adaptor 87 at one end of one of the pipes 84 or 86 and a vertical portion 92 axially adjustable to interfit within a receiving aperture of a front or rear upper or lower end plenum 94. Additional clamps 89 lock the vertical portions 92 in adjusted positions relative to its receiving plenum 94. Each end plenum 94 extends transversely of the axis of glass movement through the tempering apparatus. Vertical adjustment of each elbow relative to its attached plenum provides a pair of discontinuous apertured walls conforming generally to the shape of the glass sheets undergoing treatment. Air under pressure is imparted from a blower (not shown) through upper and lower flexible ducts 95 to feeder lines 96. The latter deliver pressurized air to the opposite ends of the end plenums 94 and thence to the upper and lower apertured pipes 84 and 86 and through their apertured walls to the opposite surfaces of a glass sheet supported by a tempering ring 70 at the cooling station.

The upper end plenums 94 are attached to the lower ends of vertically adjustable rods 85 supported from a portion of the skeleton support 21. The position of the plenums 94 and feeder lines 96 are adjusted to control the distance between the upper set of pipes 84 and the upper surface of a glass sheet in the cooling station.

One of the lower plenums 94 is pivotally attached to the support structure 21 at pivot means 93 near the shaping station 13. A piston 97 having air inlets 98 and 99 is provided to lower the lower tempering medium delivery means 86 at its portion remote from the shaping station 13 to pivot the lower set of pipes 86 in an obliquely downward direction whenever fragments are produced at the cooling station 14. In the illustrative embodiment, the lower feeder lines 96 are connected to a bracket 100. The latter is pivotally attached at a pivot 102 to an enlarged upper end of a piston rod 104 of the movable piston 97. The piston 97 is pivotally mounted on a lower pivot 106 at its bottom end so as to enable the piston and its rod to pivot in response to the raising and lowering of piston rod 104.

Whenever a glass sheet breaks into fragments at the cooling station 14, an operator depresses a button that causes air under pressure to enter the piston 97 via air line 98. This pressure lowers the piston rod 104 which causes the entire lower set of apertured pipes 86 and the end plenums 94 and feeder lines 96 attached thereto to pivot in unison at an angle of 28 degrees about pivot 93 in oblique downward direction away from the exit of the furnace and the shaping station. The fragments slide downwardly away from the furnace to the floor where they are readily removable. Sufficient pressure is applied to rotate the lower set of apertured pipes 86 sufficiently rapidly to their obliquely down position to develop a bump. This bump dislodges any fragments that might otherwise become hung in an aperture of a smooth upper surface of a pipe 86.

When the fragments slide off the upper apertured walls, the piston 97 is then pressurized through air line 99, which raises piston rod 104 and pivots the lower tempering medium imparting means comprising lower pipes 86 into a horizontal orientation. A Miller cylinder A84B having a 6-inch bore, an 18-inch stroke and a 2-inch diameter extended rod has been found suitable for controlling the pivotal movement of the lower means for supplying tempering medium and returning the latter means to its operating position in a matter of a few seconds.

In the claims, the upper set of apertured pipes 84, the upper end plenums 94 that feed tempering medium such as cold air into the ends of the upper pipes and the upper feeder lines 96 that supply the upper end plenums 94 are referred to as first means or upper means for delivering tempering medium under pressure toward the upper surface of a heated glass sheet. Likewise, the lower set of apertured pipes 86 together with the lower end plenums 94 and the lower feed lines 96 are referred to as second means or lower means for delivering tempering medium under pressure toward the lower surface of said glass sheet. The tempering ring 70 constitutes means for supporting a heated glass sheet in a substantially horizontal disposition intermediate the first and second tempering medium delivering means. The pivot 93 provides means for supporting the second tempering medium delivery means in pivotal relation to the skeleton support structure 21 (which is also referred to as support means) and the piston 97 operatively connects the second tempering medium delivering means to pivot or rotate the second tempering medium delivery means between a substantially horizontal disposition disposed in solid lines in FIG. 5 and in the other views of the apparatus and an oblique orientation disclosed in phantom in FIG. 5. The piston 97 is disposed away from the furnace 12 and shaping station 13 relative to the pivot 93 so that when the piston 97 actuates piston rod 104 to a downward position, the second tempering medium delivering means including the lower set of apertured pipes 86 is pivoted obliquely downward in a direction away from the furnace. This movement of the piston takes place at the option of an operator only when a glass sheet in the process of being tempered becomes fractured at the cooling station and it becomes necessary to remove the resulting particles or fragments.

When piston rod 104 is moved upward, a curved space is provided about a horizontal axis between the first means for delivering tempering medium comprising the upper set of apertured pipes 84 and the second means for delivering tempering medium comprising the lower set of apertured pipes 86 when the pipes 84 and 86 are arranged to receive a curved tempering ring 70 therebetween. The pipe positions are arranged to space the apertured walls of opposite pipes about 1¾ inch from the opposite glass sheet surface.

Each pipe 84 and 86 has elongated apertures in the form of slots in only its wall that faces a major surface of the glass sheet. Each slot has a minimum dimension of twice the wall thickness so that air blasts passing through each slot widen in area considerably en route to the glass surface to facilitate cooling the entire glass surface more uniformly.

Each pipe 84 or 86 is built of aluminum or steel or other suitable metal 1/16 inch thick. The pipes are rectangular in cross-section and preferably are 1¾ inch square with a ⅛ inch spacing between pipes. Rows of slots are spaced on 2 inch centers along the length of each pipe. Each slot extends transversely of the pipe length, is ¼ inch long by ⅛ inch wide and has rounded ends of 1/16 inch radius. The slots in each row are arranged in symmetrical relationship to the longitudinal center line of the apertured wall facing the glass sheets undergoing tempering. Alternate rows of slots have 2 and 3 slots therein. The slots are spaced about ½ inch from end to end along each line of slots. A line of two slots in one pipe is aligned with a line of three slots in the adjacent pipes.

When a glass sheet is in position at the cooling station 14, the tempering ring is reciprocated at a 3½ inch displacement parallel to the length of the pipes so that the arrays of slots can provide complete coverage for glass sheets undergoing cooling. The ⅛ inch spacing between adjacent pipes provides spaced escape passageways having a greater total area than the total area of the slots. The blasts of air or tempering medium applied through the slots toward the glass surface are thus provided paths of escape that are no more than one inch along the glass surface from the points at which the tempering medium is applied toward the glass surface.

For tempering glass sheets ⅛ inch thick, the glass was heated to a temperature of about 1200° F. to 1240° F. and cooled by applying air at a pressure of about 5 pounds per square inch to the upper end plenums and about 4¾ pounds per square inch to the lower end plenums. Air streamed from the apertures while the glass reciprocated for 10 seconds at a rate of 45 reciprocations per minute. The glass had a good temper (about 16,000 pounds per square inch surface compresion) and an adequate optical pattern.

The tempering ring 70 is in the form of an outline rail of stainless steel or the like having a contour and outline that conforms to the shape imparted to the glass sheet G at the shaping station 13 and has a serrated shaping rail having a shape conforming to the shape slightly inside the perimeter of the glass sheet. The rail is also provided with apertures below and intermediate adjacent serrations to minimize throttling of the flow of tempering medium along the marginal glass sheet support. The shaping rail is suitably reinforced and the reinforced structure is supported in cantilever fashion from a support carriage that is attached to selected links of the second conveyor 22 so that movement of the second conveyor 22 controls the movement of the tempering ring 70.

The various conveyors and pistons and other actuating elements are operated according to a cycle controlled by a cycle control means (not shown). A suitable apparatus for coordinating the movement of the various elements of the apparatus so as to synchronize the operating cycle is a device known as a Programable Matrix Controller PMC made and sold by the Allen Bradley Company of Milwaukee, Wis. A glass sensing device (not shown) near the exit of furnace 12 is used to initiate the operation of the bending and tempering cycle in a manner well known in the art. Since the rest of the cycle other than the portion thereof that takes place at the cooling station is not pertinent of the present invention, details thereof will be omitted for the sake of brevity.

It is understood that the present invention may be used with any type of glass tempering apparatus where the glass occupies a position between upper and lower quenching means or tempering medium supplying means and the main purpose of the present invention is to avoid the necessity for stopping the operation of a glass sheet tempering apparatus when a glass sheet breaks into fragments or cullet during the cooling step of a tempering operation. The removal of the fragments or cullet by operating piston 97 has been shown to be controlled manually by an operator when needed and a quickly pivotable lower tempering medium imparting means is essential to the operation of the present invention.

The form of the invention shown and described in this disclosure represents an illustrative preferred embodiment thereof. It is understood that various changes may be made, such as changing the orientation of the pivoting axis and the axis of reciprocation of the glass in the cooling station so as to dump the fragments or cullet to one side of the cooling station rather than downstream of the cooling station, for example, without departing from the gist of the invention as defined by the claimed subject matter which follows.

What is claimed is:

1. In apparatus for tempering glass sheets comprising means for supporting a heated glass sheet in a substantially horizontal disposition at a location in a cooling station, first means located above said location for delivering tempering medium under pressure toward the upper surface of said heated glass sheet, and second means located below said location for delivering tempering medium under pressure toward the lower surface of said heated glass sheet, the improvement comprising means for pivotally supporting said second tempering medium delivering means and means operatively connected to said second tempering medium delivering means to pivot said second tempering medium delivering means between a first position wherein the upper surface of said second tempering medium delivering means occupies a substantially horizontal orientation for delivering tempering medium against the lower surface of said heated glass sheet and a second position wherein said latter upper surface occupies an oblique orientation for removing glass fragments when a glass sheet is broken during the delivery of said tempering medium thereagainst.

2. In apparatus as in claim 1, further including conveyor means for conveying said glass sheet supporting means into said location intermediate said first and second tempering medium delivering means for the application of tempering medium toward said glass sheet while the latter is at said location and for removing said glass sheet supporting means from said location thereafter.

3. In apparatus as in claim 2, further including a tunnel-type furnace, said conveyor means extending through said furnace and through said location intermediate said first and second tempering medium delivering means, wherein said means operatively connected to said second tempering medium delivering means is constructed and arranged to pivot said second tempering medium delivering means between a first position wherein its upper surface is oriented substantially horizontally and a second position wherein its upper surface is oriented at an oblique orientation extending obliquely downward in a direction away from said furnace.

4. In apparatus as in claim 3, wherein said second tempering medium delivering means comprises a plurality of elongated pipes having smooth flat apertured walls facing upward, said pipes being arranged in closely spaced, side by said relation, means to support each elongated pipe in a preselected position relative to each other elongated pipe so that said walls are arranged to conform to the shape of a glass sheet undergoing treatment and means is provided to reciprocate said glass sheet in a direction parallel to the length of said pipes while tempering medium is applied under pressure through said apertures toward said supported glass sheet and removed through the close spaces between adjacent of said pipes.

5. In apparatus as in claim 4, wherein said apertured walls have a given thickness and said apertures have a minimum dimension at least twice said thickness so that each blast of tempering medium applied through said apertures widens significantly en route to a surface of said supported glass sheet.

6. In a method of tempering glass sheets wherein a heated glass sheet is supported between upper and lower means for delivering tempering medium thereagainst under pressure while being cooled by the applications of said tempering medium thereagainst, and wherein said glass sheet is fractured during said application, the improvement comprising pivoting said lower means for delivering tempering medium downward into an oblique position to permit glass fragments resulting from said fracture to slide off said lower means and, after said fragments are removed, pivoting said lower means upward to resume its original position.

7. The improvement as in claim 6, wherein said pivoting is accomplished rapidly enough to cause a bump that facilitates the removal of said fragments from said lower means.

References Cited
UNITED STATES PATENTS

| | | | |
|---|---|---|---|
| 3,372,016 | 3/1968 | Rahrig et al. | 65—114 |
| 3,782,916 | 1/1974 | Powell et al. | 65—104 |
| 1,569,082 | 1/1926 | Fox | 65—165 |

ARTHUR D. KELLOGG, Primary Examiner

U.S. Cl. X.R.

65—104, 168, 348